(12) United States Patent
Peters et al.

(10) Patent No.: US 6,781,707 B2
(45) Date of Patent: Aug. 24, 2004

(54) MULTI-SPECTRAL DISPLAY

(75) Inventors: Paul F. Peters, Suwanee, GA (US); Jerry C. Nims, Atlanta, GA (US); William M. Karszes, Rosewell, GA (US)

(73) Assignee: Orasee Corp., Duluth, GA (US)

( * ) Notice: Subject to any disclaimer, the term of this patent is extended or adjusted under 35 U.S.C. 154(b) by 19 days.

(21) Appl. No.: 10/102,888

(22) Filed: Mar. 22, 2002

(65) Prior Publication Data

US 2003/0179388 A1 Sep. 25, 2003

(51) Int. Cl.$^7$ .............................................. G06F 15/00
(52) U.S. Cl. ...................... 358/1.1; 358/296; 382/275; 345/634
(58) Field of Search ...................... 358/1.1, 296, 450, 358/525, 539, 500, 512, 529; 382/275, 191, 165, 209, 224, 166, 132; 345/634, 648

(56) References Cited

U.S. PATENT DOCUMENTS

| | | | |
|---|---|---|---|
| 4,918,536 A | 4/1990 | Sakakibara et al. | |
| 4,939,584 A | * 7/1990 | Sakakibara et al. | ......... 358/296 |
| 5,057,163 A | 10/1991 | Barnett et al. | |
| 5,319,472 A | 6/1994 | Hill et al. | |
| 5,680,150 A | 10/1997 | Shimizu et al. | |

* cited by examiner

Primary Examiner—Twyler M. Lamb
(74) Attorney, Agent, or Firm—Patton Boggs LLP

(57) ABSTRACT

Images of an object or geographical area obtained for a plurality of optical bands. The images are transferred to a digital processor which rasterizes and interleaves the images to an output file for printing. The output file is printed in an alignment with a microlens sheet having a plurality of lenses. The lenses refract the printed image such that a viewer sees from a first position relative to the hard copy an image corresponding to the object or geographical area as seen in a first frequency band of the optical spectrum and, from a second viewing position sees an image corresponding to the object or geographical area as seen in a second frequency band of the optical spectrum. At least one of the first and second frequency bands may be a non-visible band. The viewed images may include an indicia of the optical band corresponding to the image.

13 Claims, 3 Drawing Sheets

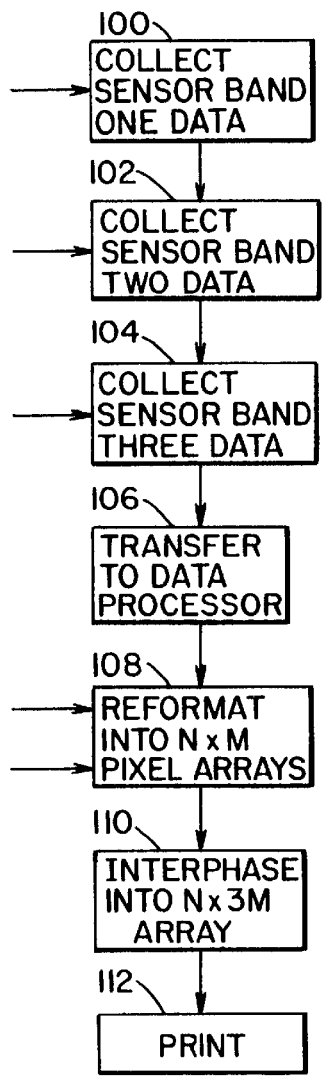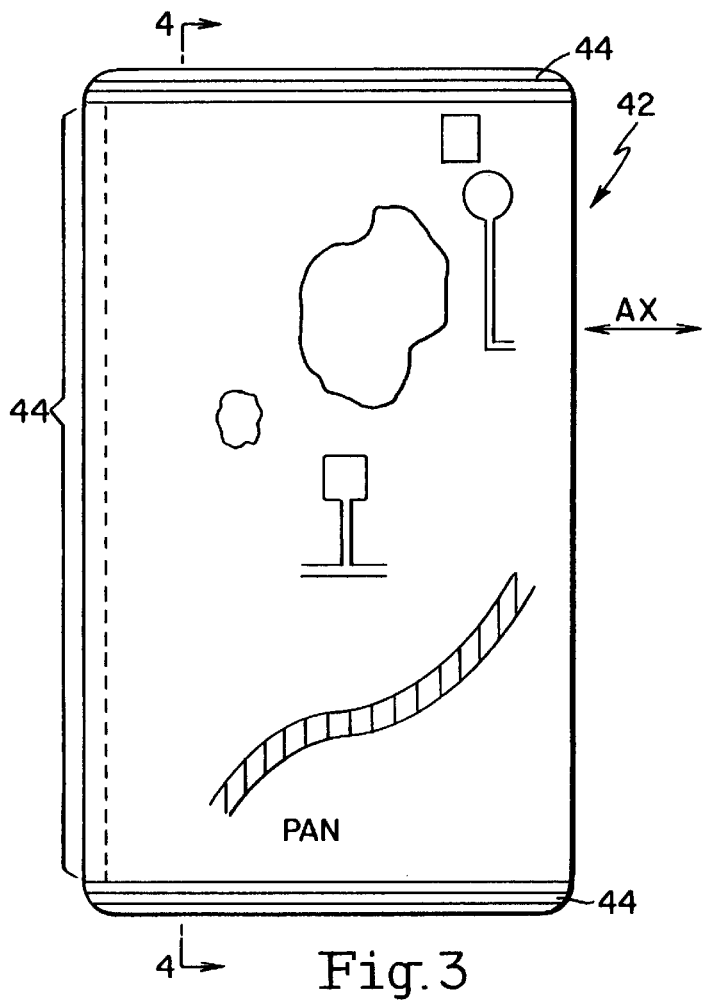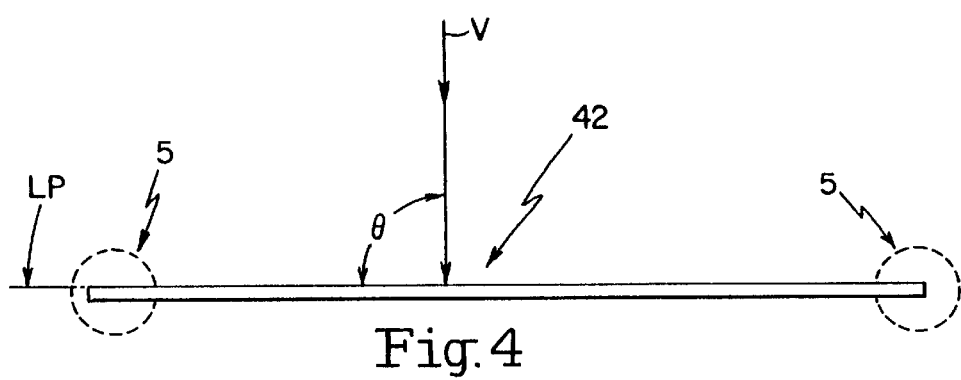

MULTI-SPECTRAL DISPLAY

BACKGROUND OF THE INVENTION

1. Field of the Invention

This invention relates generally to the collection and presentation of optical information and, more particularly, to the acquisition, processing, and visible presentation, by way of passive hard copy, of multi-spectral optic information.

2. Statement of the Problem

Physical objects, ranging from microscopic specimens through to items of astronomy, are identified and described by their optical characteristics. The meaning of an object's "optical characteristics" includes its visible appearance, as well as its reflection, absorption, and generation of optical energy outside of the visible spectrum. The visible representation of the optical characteristics, meaning those that can be seen by a human being, however, must be in the visible spectrum. Therefore, if an object has characteristics in a non-visible portion of light spectrum the characteristics are mapped or translated to the visible portion.

One example mapping or translation is a chemical photographic film that presents visible changes when it is irradiated by non-visible light. A particular example is infra-red film, or a camera using film that shows exposure to both infrared and visible light, but having a light filter blocking all light other than infrared. Using such an infra-red film, or infrared camera, a picture taken, for example, of a person will look like a greenish monocolor image having light and dark areas corresponding to the person's infrared radiation pattern. Similarly, a picture of a terrestrial area taken from an airborne platform, or from a satellite, using an infrared film or infrared camera will typically appear as a monocolor image, with light and dark areas showing the infrared radiation. A comparable image is seen using ultraviolet film.

Other scientific areas using images obtained from portions of the optical spectra other than the visible bands include, without limitation, medical imaging and astronomy.

In the current art, images taken at a particular optical spectra are displayed on an individual hard copy, or as an individual image placed on a separate, discrete location of a particular hard copy. For example, an astronomy textbook may have on one of its pages a picture of Jupiter as seem through a telescope at the visible wavelengths of the optical spectrum while, on another page, there may be a picture of Jupiter taken through the same telescope using infrared film. Another example is the field of aerial photography and satellite photography where, if an area of interest has different information observable in different portions of the optical spectrum, the person who wishes to study the information is typically provided with a separate hard copy for each of the different spectral bands in which such information exists.

There are problems, however, associated with having, for one item or object of interest, a separate hard copy picture or image for each of a plurality of ranges of the optical spectrum. These problems may cause particular concern in technical areas such as airborne and satellite imaging, and medical imaging, where the cost of error may be high. Examples of such problems include the overhead, including manpower and time, caused by having to keep inventory over plurality of pictures.

Another example problem caused by requiring a separate picture for each spectral band image of an object or geographical area of interest is that the viewer must change his or her visual focus continually, from looking at a picture at one spectral band to looking at another picture at another spectral band. In addition to being inconvenient this increases the probability of human error because the user must remember how something looked in one range of the optical spectrum when looking at it again in another range.

Still another problem with requiring a separate hard copy picture for each range of the optical spectrum is that the pictures may not be aligned or registered properly with one another. For example, the viewer may have a hard copy of a first picture of a ground area, taken from a panchromatic camera on an airborne surveillance platform, in which an area of interest is situated in, for example, the upper left corner of the copy. A second picture of the same ground area, taken from a near infrared (NIR) camera on the same, or another platform may show the same area in its upper right corner.

It will be understood that for purposes of this description the term "pictures" is defined to include, except where another meaning is stated or is obvious from the context in which the term is used, any visible image regardless of the technology or the method by the which it was originally captured. For example a printed form of an image captured by a digital camera is a "picture" for purposes of this description.

The Solution

The present invention advances the art and overcomes the problems identified above by placing on a single microlens sheet images of an object or area as it appears, or as it can be represented as appearing, within a plurality of wavelength or frequency bands or the optical spectrum, such that the viewer can move or orient the sheet to see the object's or area's radiation pattern in any of such bands.

In one embodiment of the invention a detection image is generated by each of a plurality of optical image sensors, each sensor having a particular detection frequency band. A first spectral band digital pixel array, representing the generated detection image from a first band of the optical spectrum is input to a data processor. Likewise, a second spectral band digital pixel array, representing the generated detection image from a second band of the optical spectrum is input to the data processor. The data processor receives, or retrieves a prestored value of, a microlens parameter data specifying physical parameters of a microlens sheet. The data processor generates an output interphased or interlaced digital pixel array based on the first spectral band digital pixel array, the second spectral band digital pixel array, and the microlens parameter data. The output interphased digital pixel array includes information for printing an image representing a rasterized form of the first spectral band digital pixel array interlaced with a rasterized form of the second spectral band digital pixel array. The rasterization is such that a predetermined number of raster lines of each of the first spectral band digital pixel array, in an alternating pattern with a predetermined number of raster lines of the second spectral band digital pixel array, can be overlaid by each microlens of a microlens sheet in accordance with the microlens parameter data. A visible interphased image is printed on a printable surface of a hard copy sheet, the printed image being based on the output interphased digital pixel array, and a microlens sheet is overlaid onto the printable surface.

The output interphased digital pixel array is generated, and the visible interphased image is printed such that when the microlens sheet is overlaid the user sees, from a first viewing position, a first spectral mage of the object or area of interest, which is how it would appear if it were seen in the first spectral band and, from a second viewing position, sees a second spectral image of the object or area of interest, which is how it would appear if it were seen in the second spectral band.

In a further aspect of the invention, the data processor also receives, or retrieves a prestored value of, a printing device parameter data specifying physical characteristics of a printer for applying a visible image to a tangible medium. The output interphased digital pixel array is generated further based on the printing device parameter data.

In one variation of the first embodiment, the microlens sheet comprises a plurality of semi-cylindrical or similar cross-section transparent lenses, lying in a plane and extending parallel to one another. A rotation axis lies in the plane and extends in a direction parallel to the lenses. The first orientation and position includes a first rotation of the hard copy sheet about the rotation axis and the second orientation and position includes a second rotation of the hard copy sheet about the rotation axis.

In a further variation of the first embodiment the microlens sheet comprises a plurality of lenses, each having a circular or elliptical circumference, and each having a hemispherical or aspherical cross-section. A first rotation axis lies in the plane, and a second rotation axis lies in the plane and extends normal to the first rotation axis. The first orientation and position includes a first rotation of the hard copy sheet about the first rotation axis and the second orientation and position includes a second rotation of the hard copy sheet about the first rotation axis.

An objective of the present invention is to display multiple images, each representing the appearance or radiation characteristics of an object or observational area in particular band of the optical spectrum, on a single hard copy. The single hard copy can then be used, for example, in military or law enforcement briefings and then distributed to those involved, e.g., analysts, pilots, special operations persons. The single hard copy can be used in textbooks, periodicals and other publications in the fields, for example, of astronomy and medicine.

These and other objects, features and advantages of the present invention will become more apparent to, and better understood by, those skilled in the relevant art from the following more detailed description of the preferred embodiments of the invention taken with reference to the accompanying drawings, in which like features are identified by like reference numerals.

BRIEF DESCRIPTION OF THE DRAWINGS

FIG. 2 shows an example flow chart of a first method according to the present invention;

FIG. 3 shows a top view of a microlens-based hard copy displaying an example image of an object representing its radiation at an example first band of the optical spectrum;

FIG. 4 shows a cross-sectional image of the microlens hardcopy as seen from the projection line 4—4 of FIG. 3;

DETAILED DESCRIPTION OF THE INVENTION

Figure 1:
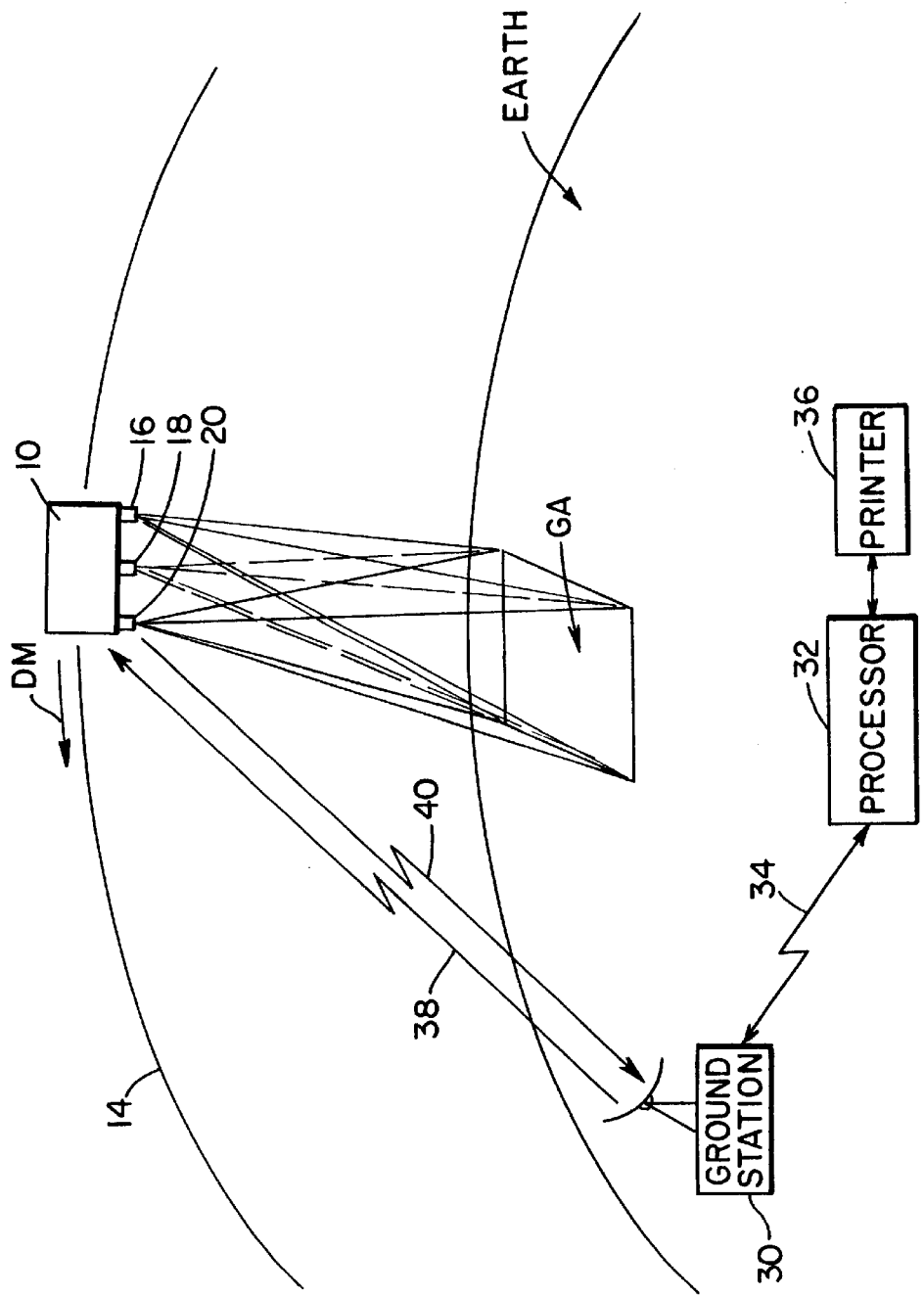
FIG. 1 depicts an example surveillance system for obtaining multispectral images for processing and displaying according to the present invention.

FIG. 1 shows an example of a image detection and processing system for obtaining multispectral optical images to be displayed using the method and apparatus of the present invention. The FIG. 1 example system comprises a low earth orbit (LEO) satellite 10 moving along an orbit path 14. Mounted on the satellite 10 is a panchromatic black and white camera 16, a visual near-infrared (VNIR) band camera 18, and a short wave infrared (SWIR) band camera 20. The cameras 16, 18 and 20 are, respectively, conventional panchromatic, VNIR and SWIR satellite-capable units available from numerous vendors, as known to persons skilled in the art of satellite-based multispectral imaging.

The FIG. 1 satellite-based platform and the cameras 16, 18 and 20 are only for purposes of example. The present invention contemplates display of images obtained from multispectral image detectors combined with, or mounted on, any observational platform known in the art, manned aircraft, unmanned aircraft, land-based optical telescopes, space-based optical telescopes, and microscopes. It will also be understood that the VNIR and SWIR bands are example bands only, and are not intended as a limitation on the invention, as this invention can employ any cameras within any plurality of bands within the optical spectrum.

The pointing direction of each of the cameras 16, 18 and 20 is illustrated as aligned such that the coverage of each is coincident with that of the others, over an area labeled GA, but this is only for purposes of example. As known in the art, one of the cameras such as, for example, 16, could look forward relative to cameras 18 and 20 with respect to the direction of movement DM along the orbit. An image from the forward camera 16 would be obtained at, for example, time T0, and after the satellite had moved in the DM direction a time duration, referenced as T1, the field of view of one of the other cameras, such as 18, would coincide with that of camera 16 at T0. The image from camera 18 would then be obtained, thereby providing an SNIR image of the same area that camera 16 provided a panchromatic image of at time To. The process would be repeated using camera 20 at time T2, thereby providing an SWIR image of the same area that camera 16 provided a panchromatic image of at time T0, and that camera 18 had provided an SNIR image of at time T1.

Depending on the particular mounting structure for the cameras 16, 18 and 20, alignment of their respective pointing directions may be necessary. Alignment procedures for multiple optical surveillance cameras such as 16, 18, and 20 are known in the art and, therefore, description is omitted. The uplink and downlink systems for communications from the ground station 30, and the procedures and systems for controlling and stabilizing the satellite 10 are known in the art, and description for these is also omitted.

Also shown in FIG. 1 is a ground station 30, a processing station 32, a communication link 34 between the ground station 30 and the processing station 32, and an inkjet printer 36. An example implementation of the data processor 32 is a commercially available general purpose programmable digital computer having, for example, a standard protocol digital input port, a microprocessor, operating system storage, operating system software stored in same, application program storage, data storage, a standard protocol digital output port and, preferably, a user interface, and a video screen. An example is a Dell® model Optiplex® GX 150 having a 1 GHz Intel® Pentium) III or Celeron®) microprocessor, 528 MByte RAM, a 60 GByte hard drive, an LCD or a cathode ray tube (CRT) video display, and a standard keyboard and mouse for user entry of data and commands, running under the Microsoft Windows 2000® or Windows XP® operating system. An example printer 36 is an Epson® model 980 inkjet printer.

An uplink 38 carries command and control signals from the ground station 30 to the satellite 10, and a downlink 40 carries camera sensor data, described below, and satellite status information. The ground station 30, the uplink 38 and the downlink 40 are in accordance with the known art of satellite communication and control and, therefore, description is not necessary for understanding or practicing this invention.

FIG. 2 shows an example flow chart for a first embodiment of the invention, and an example operation will be described in reference to the system illustrated by FIG. 1. The operation described in reference to FIG. 1 is only an example, and the FIG. 2 flow chart can be followed to generate and display multispectral images based on information obtained from a wide range of other optical detector systems.

The example flow chart shown by FIG. 2 omits steps of image sensor data collection that are system-specific, and omits steps known to persons skilled in the relating arts of optical surveillance and observation which are not germane to this invention. It will also be understood that the satellite 10, and the cameras 16, 18 and 20 may be components of an observation system shared with, and owned and operated by, others, which was not designed specific to the present invention. The present invention can be practiced using such systems as the image collection source.

Referring to FIG. 2, first, at block 100 SENSOR BAND ONE data for the GA area is collected. For the example system of FIG. 1, step 100 is the collection of data generated by the panchromatic camera 16. The collection could, for example, be at the ground station 30, or at another receiving station. Next, at step 102 SENSOR BAND TWO data for the same GA area is collected. For the example collection system of FIG. 1, SENSOR BAND TWO data is that generated by the VNIR camera 18. For purposes of this example, information from three optical bands is collected and, therefore, the next step, 106, collects SENSOR BAND THREE data, which for the FIG. 1 example system is data from the SWIR camera 20.

It will be understood that blocks 100, 102 and 104 are not necessarily performed as separate data collection steps. Instead, depending on the downlink protocol, the SENSOR BAND ONE, SENSOR BAND TWO and SENSOR BAND THREE data, i.e., data from cameras 16, 18 and 20, may be multiplexed onto a single data stream and collected concurrently. Further, the collection is not necessarily performed at the ground station 30, because other ground receiving stations (not shown) may receive the data downlink from the satellite 10. Such arrangements of ground stations and data collection stations are known in the art. Still further, the collection steps 100, 102 and 104 may include retransmission through ground repeaters (not shown), as well as encryption and decryption, and land-line transmissions. These data transfer methods and protocols are known in the art.

After the SENSOR BAND ONE, SENSOR BAND TWO, and SENSOR BAND THREE data is collected the method goes to step 106, which formats the data, sends it over the link 34 and inputs it to a data processor, shown as item 32 in FIG. 2. The link 34 may be the Internet and, accordingly, the formatting, transfer and input may further include data and data network transmissions such as, for example, a File Transfer Protocol (FTP) transfer. The link 34 is shown for purposes of example only. The data processor 32 may be local to the ground station 30, or to any other ground receiving station.

It will be understood that the data collection steps 100, 102 and 104 may be merged with the inputting step 106. For example, data generated by image sensors such as the cameras 16, 18 and 20 may be broadcast over the Internet, with time markers and other information identifying the geographical location that the image data corresponds to. Information describing such broadcast data, and subscriber requirements for obtaining and decoding it, is found in publications known to persons skilled in the art of satellite imagery.

After inputting to the data processor 32, step 108 reformats the SENSOR BAND ONE, SENSOR BAND TWO and SENSOR BAND THREE data into three N×M pixel arrays, which are labeled for reference as BandOnePixelArray, BandTwoPixelArray and BandThreePixelArray. The step 108 reformatting is based on a predetermined, user-input MicroLensData which characterizes physical parameters of the microlens sheet through which the final printed image will be seen. An example microlens sheet is described in reference to FIGS. 3 through 6. Preferably, the physical parameters of the microlens sheet include the number of lenses per inch (LPI). The final printed images are seen through the microlens sheet by printing them on a material onto which the microlens sheet is overlaid, or printing them onto a printable surface of the microlens sheet itself. Step 108 may be further based on a PrinterResData characterizing performance parameters of the printer 36, particularly the printer's resolution in, for example, dots per inch (DPI). Step 108 uses at least the LPI value of the MicrolensData information and the DPI value of the PrinterResData to convert the SENSOR LEFT, SENSOR RIGHT and SENSOR CENTER data into N×M pixel arrays BandOnePixelArray, BandTwoPixelArray and BandThreePixelArray.

The parameters N and M are preferably selected to place an optimal number of printed pixels under each microlens or lenticule of the microlens sheet. The value of N and M is preferably based on the smallest pixel dimension that an identified printer can print, the thickness of the microlens sheet, number of lenses per inch of the microlens sheet, and the number of images that are to interlaced by the steps described below. For the present example operation, the number of images that will be interlaced is three, namely the BandOnePixelArray, BandTwoPixelArray and the BandThreePixelArray. An example value of PrintResData is 760 DPI, and an example value of the MicroLensData is 30 LPI.

As known to persons skilled in the art, the number of pixels, and the pixel resolution of the cameras 16, 18 and 20 may differ with respect to one another. Reasons for the differences include, without limitation, the cameras having a different number of charge coupled device (CCD) photodetectors and different magnifications. If the cameras have different pointing directions, with respect to the orbit path 14, when detecting the same area then the ground area represented by their respective pixels will not be the same. It may therefore be necessary to map, enlarge, or reduce one or more of the BandOnePixelArray, BandTwoPixelArray and BandThreePixelArray data sets so that each has the same resolution in ground area per pixel. Further, due to likely differences between the sensitivities of the three cameras 16, 18 and 20, the pixel amplitudes may have to be normalized to a common value. Numerous mapping and normalization algorithms for such purposes are known in the art and, therefore, description is omitted.

Referring to FIG. 2, after the step 108 reformatting, step 110 generates an interlaced pixel array InterPhaseData, which is a N×3M pixel array representing a rasterization and interlacing, or interphasing, of the BandOnePixelArray, BandTwoPixelArray and BandThreePixelArray. The dimension of the array being N×3M is specific to this example, and is based on each of the BandOnePixelArray, BandTwoPixelArray and BandThreePixelArray data sets being an N×M array. Step 112 then prints the InterPhaseData for display through a microlens sheet such as the example shown in FIGS. 3 and 4. Objectives and parameters of the step 110 interlacing operation will be described in reference to FIGS. 3 and 4.

Figure 5:
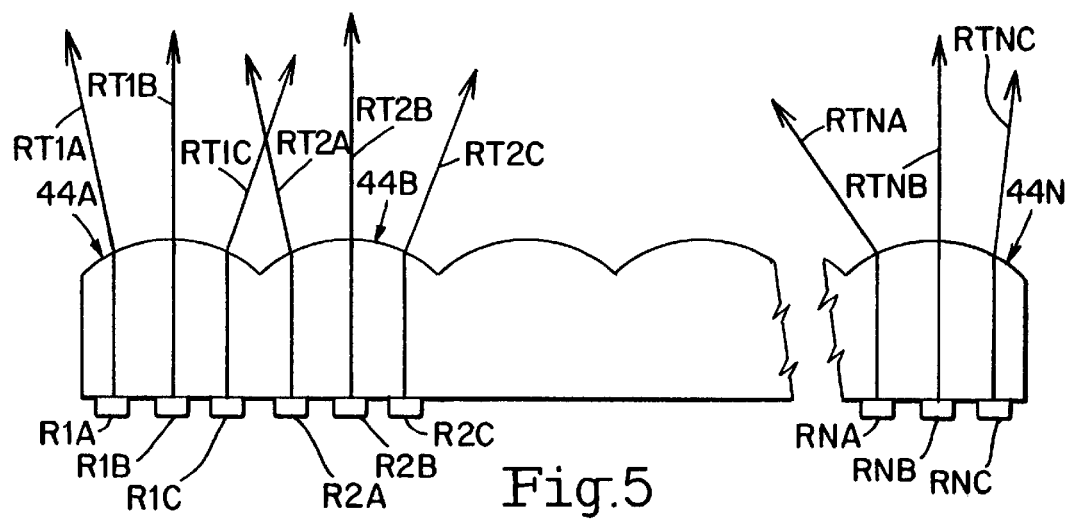
FIG. 5 is a detailed enlarged view of the areas of FIG. 4 labeled "5"

FIG. 3 is a top view of an example microlens sheet 42, FIG. 4 is a cross-section of the FIG. 3 microlens sheet 42 as seen through view line 4—4, and FIG. 5 is an enlargement of the FIG. 4 areas labeled "5". Referring to FIG. 3, a plurality of M microlenses 44, labeled 44A through 44M, extend in the direction labeled AX. As seen in FIG. 4, under the first microlens 44A are three raster lines printed at step 112, labeled R1A, R1B, and R1C. Likewise, under the second microlens 44B are three raster lines, labeled R2A, R2B, and R2C. Raster lines are collectively referenced as R. The raster line R1A is a printed line of N pixels corresponding to a first row of the BandOnePixelArray, the raster line R1B is a printed line of N pixels corresponding to a first row of the BandTwoPixelArray and the raster line R2C is a printed line of N pixels corresponding to a first row of the BandThreePixelArray. The raster lines being N pixels in length is only for purposes of example. More particularly, the InterPhaseData array is described as an N×3M array, and the print step 112 may, without limitation, print raster lines having a number of pixels identical to the InterPhaseData dimension.

The viewer holds the FIGS. 3–6 microlens sheet 42 so that the depicted reference line AX is horizontal, i.e., such that the microlenses 44 and the raster lines R extend parallel to a line connection the viewer's left eye and right eye. The reason is that, for this example, the images seen by the person viewing the microlens sheet 42 will be two-dimensional. Other embodiments of this invention present the user with three-dimensional images.

For the FIGS. 3–6 example, the user will see one of three images when looking at the microlens sheet 42. The first of the three images is that formed by the RiA raster lines, for i=1 to M, the second is that formed by the RiB raster lines, for i=1 to M, and the third is that formed by the RiC raster lines, for i=to M. Since the images for this example are two-dimensional, the microlenses extend in the horizontal direction to provide the viewer's left eye and right eye with the same image. Which of the three images the viewer sees depends on the angle THETA between the viewing direction, labeled V, and the plane of the lenses 44, labeled LP.

The mechanism for this orientation-based view selection can be seen by referring to FIG. 4. As shown, a ray trace RT1 of light reflected off the BandOnePixelArray raster line R1A under the first microlens 44A is refracted in a first depicted manner. Likewise, the ray trace RT2 of light reflected off the BandTwoPixelArray raster line R1B under the first microlens 44 is refracted in a second manner, while the light from the BandThreePixelArray raster line R1C is refracted in a third manner. The difference between the refraction of R1A, R1B and R1C is due to their respectively different positions under the microlens 44A. Each of the remaining microlenses 44C through 44M has three raster lines arranged, relative to one another, as shown under the first microlens 44A. The ray trace from each of the three raster lines under each of the remaining microlenses differ from one another in a manner similar to that depicted by RT1, RT2 and RT3.

The location of the raster lines R is such that at least one value of THETA exists where all, or most, of the raster lines from just one of the BandOnePixelArray, BandTwoPixelArray and BandThreePixelArray images are refracted toward the user eyes, while the raster lines from the other images cannot be seen.

Methods for the step 110 calculating of the positions of the raster lines, i.e., the pixels in the InterPhaseData array to produce such an orientation-based view selection are known in the art of lenticular materials. Typically such methods use ray-trace models of the microlens sheet, and the generation and utilization of such models, including models of lenticular and other multiple lens sheets, is well known in the imaging arts. Therefore, a detailed description of these is not necessary for understanding the invention. Interested readers are referred to U.S. Pat. No. 6,091,482, which is hereby incorporated by reference, and to technical publications such as, for example, "Generating Autostereoscopic Lenticular Images", by Paul Burke, posted at <http://astronomy.swin.edu.au/pbpurke/stereographics/lenticular>.

As described above, the step 110 InterPhaseData includes pixel information of the three constituent images, namely the BandOnePixelArray, BandTwoPixelArray and BandThreePixelArray, and the information as to how the images are rasterized and interlaced with one another for printing at step 112 to be under the microlens sheet. As previously identified, "placing under" means printing directly on the microlens sheet or printing on an ink-support surface and then overlaying the surface with a microlens sheet. Referring to step 112 the printing operation may include formatting operations specific to the particular computer 32 and particular printer 36 being used. For example, as known in the art of programmable digital computers and printing of data, a typical example of the computer 32 includes a step known in the art as "ripping" for converting a pixel array such as the InterPhaseData array into a raster or pixel format for printing.

Figure 6:
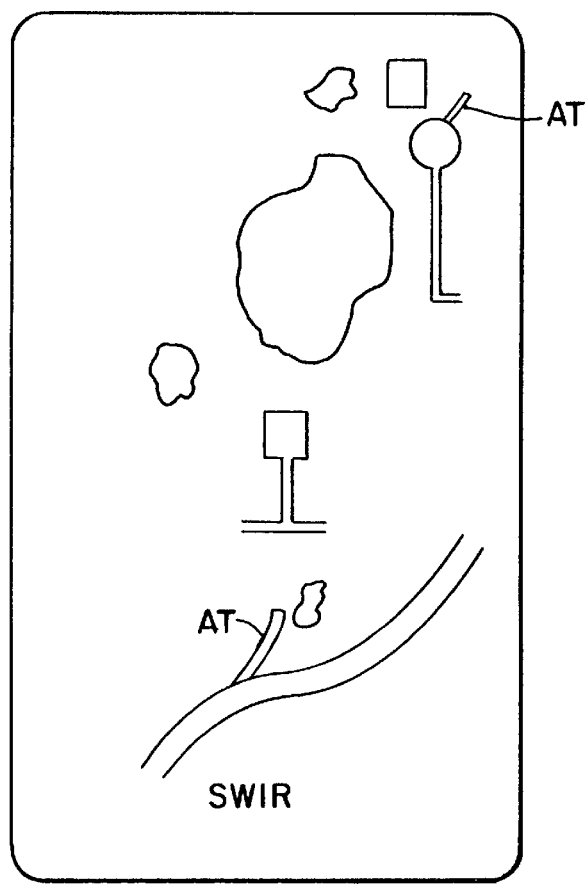
FIG. 6 shows a view of the microlens-based hard copy of FIG. 3, when rotated to display an example image of the object shown in FIG. 3 at an example second band of the optical spectrum.

Step 110, or an added step, may insert pixels into the InterPhaseData array such that the viewer sees an indicia identifying the optical band from which the viewed image was obtained. FIG. 3 shows "PAN" as an example of such an indicia, reflecting that the viewed image was obtained from the panchromatic camera 16. As described above, the PAN image is seen in FIG. 3 because it depicts the view through the microlens sheet 42 when held such that the raster lines from BandOnePixelArray are refracted to be visible to the viewer. FIG. 6 shows the same geographical area seen in FIG. 3 when the microlens sheet 42 is oriented in the THETA direction such that the viewer sees the raster lines from the BandThreePIxelArray. In the above-described example, the BandThreePixelArray corresponds to the image obtained from the SWIR camera 20. FIG. 6 depicts the result of step 110 having inserted pixels showing as "SWIR" in the image.

The example shown in FIG. 5 places one raster line from each of the BandOnePixelArray, BandTwoPixelArray and BandThreePixelArray data sets under each microlens. One raster line per image is not a limitation. Depending on the LPI of the microlens sheet, on the thickness of the sheet, and the intended viewing distance to the microlens sheet, two or more raster lines from each of the images, e.g., BandOnePixelArray, BandTwoPixelArray and BandThreePixelArray, may be placed under each microlens. Further, the raster lines are not limited to being one pixel in width. Instead, for some applications and some viewing distances, a raster line may be multiple pixels in width.

With the above-described embodiment of this invention, the viewer is provided with a single image showing the radiation pattern of an object, or geographical area, at a plurality of ranges within the optical spectrum. The user does not have to maintain multiple hard copy images, one for each band in which the object or area has been imaged. The user also does not have to study an object, or area, as it appears in first optical band and then remember this when viewing it again as imaged in a different portion of the optical spectrum. The benefit of this can be shown by referring to FIGS. 3 and 6. FIG. 3 is a panchromatic image of the geographical area labeled as GA in FIG. 1, and FIG. 6 is an SWIR image of the same area. Example artifacts may be seen in SWIR band, such as those represented as items AT in FIG. 6, which may not be visible in the panchromatic band, as represented by the AT items not appearing in FIG. 3.

Example hard copy embodiments of the microlens sheet 42 can be any viewable size such as, for example, 8½" by 11", paper size "A4", large poster-size sheets, or 3" by 5" cards.

Those skilled in the art understand that the preferred embodiments described above may be modified, without departing from the true scope and spirit of the invention, and that the particular embodiments shown in the drawings and described within this specification are for purposes of example and should not be construed to limit the invention as set forth in the claims below.

We claim:

1. A method for multispectral imagery, comprising:

detecting a first image of an object based on the object's radiation within a first frequency band of the electromagnetic spectrum;

detecting a second image of the object based on the object's radiation within a second frequency band of the electromagnetic spectrum;

generating a first image pixel array corresponding to the first image;

generating a second image pixel array corresponding to the second image;

storing a first processing image pixel array, based on the first image pixel array, in a digital processor;

storing a second processing image pixel array, based on the second mage pixel array, in the digital processor;

storing a microlens data, representing values of physical parameters of a lenticular sheet, in the digital processor;

generating an output interleaved pixel array based on an interleaving of the first processing image pixel array and the second processing image pixel array, with a spacing information based in part on the microlens data; and printing an image based on the output interleaved pixel array on a printable medium, in an arrangement corresponding to said physical parameters of the lenticular sheet, wherein the interleaving and printing is such that when the printed image is viewed through said lenticular sheet only an image based on the first pixel array is substantially visible, and when viewed through said lenticular sheet from a second viewing position only an image based on the second pixel array is substantially visible.

2. A method according to claim 1 further comprising:

detecting a third image of the object based on the object's radiation within a third frequency band of the electromagnetic spectrum;

generating a third image pixel array corresponding to the second image;

storing a third processing image pixel array, based on the third image pixel array, in the digital processor, wherein the output interleaved pixel array is further based on an interleaving of said third processing image pixel array, and wherein when viewing the printed image from a third viewing position through the lenticular sheet only an image based on the third image pixel array is substantially visible.

3. A method according to claim 1 wherein said printed image includes a first visible indicator identifying said first frequency band and a second visible indicator identifying said second frequency band, said first visible indicator and said second visible indicator being printed such that when viewing the printed image through said lenticular sheet from said first viewing position only said first visible indicator is visible and, when viewing the printed visible image through said lenticular sheet from said second viewing position only said second visible indicator is substantially visible.

4. A method according to claim 1 wherein said printed image includes a first visible indicator identifying said first frequency band, a second visible indicator identifying said second frequency band, and a third visible indicator identifying said third frequency band, said first visible indicator, said second visible indicator and said third visible indicator being printed such that when viewing the printed image through said lenticular sheet from said first viewing position with respect to the lenticular sheet only said first visible indicator is substantially visible and, when viewing the printed image through said lenticular sheet from said second viewing position with respect to the lenticular sheet only said second visible indicator is substantially visible, and when viewing the printed image through said lenticular sheet from said third viewing position with respect to the lenticular sheet only said third visible indicator is substantially visible.

5. A method according to claim 1 wherein at least one of said first frequency band and said second frequency band includes a non-visible portion of the optical spectrum.

6. A method according to claim 1 wherein at least one of said first frequency band and said second frequency band includes a non-visible portion of the optical spectrum.

7. A method according to claim 1 further including:

viewing a representation of substantially only the detected image of the object's electromagnetic radiation within said first frequency band by viewing the printed image through said lenticular sheet from said first viewing position; and viewing a representation of substantially only the detected image of the object's electromagnetic radiation within said second frequency band by viewing the printed image through said lenticular sheet from said first viewing position.

8. A method according to claim 3 further including:

viewing, concurrently, only said first indicia and a representation of substantially only the detected image of the object's electromagnetic radiation within said first frequency band by viewing the printed image through said lenticular sheet from said first viewing position; and viewing, concurrently, only said second indicia and a representation of substantially only the detected image of the object's electromagnetic radiation within said second frequency band by viewing the printed image through said lenticular sheet from said second viewing position.

9. A method according to claim 1, wherein said first frequency band is a non-visible infrared band and said second frequency band is a visible optical band, and further including:

viewing a representation of substantially only the detected image of the object's electromagnetic radiation within said non-visible infrared band by viewing the printed image through said lenticular sheet from said first viewing position; and viewing a representation of substantially only the detected image of the object's electromagnetic radiation within visible optical band by viewing the printed image through said lenticular sheet from said second viewing position.

10. A method according to claim 3 wherein said first frequency band is a non-visible infrared band and said second frequency band is a visible optical band, and further including:

viewing, concurrently, only said first indicia identifying said non-visible infrared band and a representation of substantially only the detected image of the object's electromagnetic radiation within said non-visible infrared band by viewing the printed image through said lenticular sheet from said first viewing position; and viewing, concurrently, only said second indicia identifying said visible optical band and a representation of substantially only the detected image of the object's electromagnetic radiation within visible optical band by viewing the printed image through said lenticular sheet from said second viewing position.

11. A multispectral display, comprising:

a printable medium;

an image printed on the printable medium, said image including a first plurality of pixels, representing a radiation pattern, from an object, of light within a first frequency band of the electromagnetic spectrum, arranged according to a first arrangement, and a second plurality of pixels, representing a radiation pattern from said object, of light within a second frequency band of the electromagnetic spectrum, arranged according to a second arrangement;

a lenticular sheet overlaying said printable medium, formed of a transparent material, having a plurality of microlenses arranged in a lens pattern in a plane, wherein said first arrangement, said second arrangement and said lens pattern, and an alignment of said microlenses of said lenticular sheet with respect to said first plurality of pixels and said second plurality of pixels are such that from a first viewing position with respect to the lenticular sheet only an image based on the first plurality of pixels is substantially visible and, from a second viewing position with respect to the lenticular sheet only an image based on the second plurality of pixels image is substantially visible.

12. A multispectral display according to claim 11, wherein said printed image includes a first visible indicator identifying said first band and a second visible indicator identifying said second band, such that when viewing the printed image from said first viewing position with respect to the lenticular sheet said first visible indicator is seen while said second visible indicator is not substantially seen and, when viewing the printed visible image from said second viewing position with respect to the lenticular sheet said second visible indicator is seen while said first visible indicator is not substantially seen.

13. A multispectral display according to claim 11 wherein at least one of said first frequency band and said second frequency band includes a non-visible portion of the optical spectrum.

* * * * *